US 10,099,869 B2

(12) United States Patent
De Lama Arenales

(10) Patent No.: US 10,099,869 B2
(45) Date of Patent: Oct. 16, 2018

(54) PALLETIZING INSTALLATION AND A METHOD FOR PALLETIZING

(71) Applicant: SINTER IBÉRICA PACKAGING, S.A., Burgos (ES)

(72) Inventor: Mario De Lama Arenales, Aranda de Duero (ES)

(73) Assignee: SINTER IBERICA PACKAGING, S.A., Burgos (ES)

( * ) Notice: Subject to any disclaimer, the term of this patent is extended or adjusted under 35 U.S.C. 154(b) by 218 days.

(21) Appl. No.: 15/036,045

(22) PCT Filed: Nov. 11, 2014

(86) PCT No.: PCT/EP2014/074285
§ 371 (c)(1),
(2) Date: May 11, 2016

(87) PCT Pub. No.: WO2015/071268
PCT Pub. Date: May 21, 2015

(65) Prior Publication Data
US 2016/0280474 A1      Sep. 29, 2016

(30) Foreign Application Priority Data

Nov. 12, 2013   (NL) .................................... 2011789

(51) Int. Cl.
*B65G 57/06*       (2006.01)
*B65G 47/08*       (2006.01)
(Continued)

(52) U.S. Cl.
CPC ........... *B65G 57/06* (2013.01); *B65G 47/082* (2013.01); *B65G 47/086* (2013.01);
(Continued)

(58) Field of Classification Search
CPC ...... B65G 7/06; B65G 47/082; B65G 47/086; B65G 57/005; B65G 7/035; G65G 7/245
(Continued)

(56) References Cited

U.S. PATENT DOCUMENTS 3,252,594 A     5/1966   Verrinder
3,517,831 A  *  6/1970   Hahn ..................... B65G 60/00
                                                    414/416.07
(Continued)

FOREIGN PATENT DOCUMENTS

FR       2396708 A1       2/1979
JP       2011-010427 A    1/2011

OTHER PUBLICATIONS

International Search Report for Application No. PCT/EP2014/074285, dated Jan. 20, 2015, 2 pgs.

*Primary Examiner* — Patrick H Mackey
(74) *Attorney, Agent, or Firm* — Squire Patton Boggs (US) LLP

(57) ABSTRACT

A palletizing installation comprising two palletizing devices (10, 20) and a linear common feed conveyor (1). Each palletizing device has a stationary mounted shutter device (22) and a pallet lifter (26). A stationary mounted row formation platform (28) is present to form thereon a row of products, which platform has a lateral side that extends adjacent a lateral side of the common feed conveyor. Each palletizing device comprises a product row transfer mechanism (30) that is adapted to slide a row of products from the row formation platform onto the layer formation surface of the shutter device in closed state. The installation further comprises a product ejector system and one or more product ejector devices (41) which are adapted to eject a product from the common feed conveyor such that the product moves onto a selected product location of said at least two row formation platforms.

18 Claims, 10 Drawing Sheets

Figure 1:
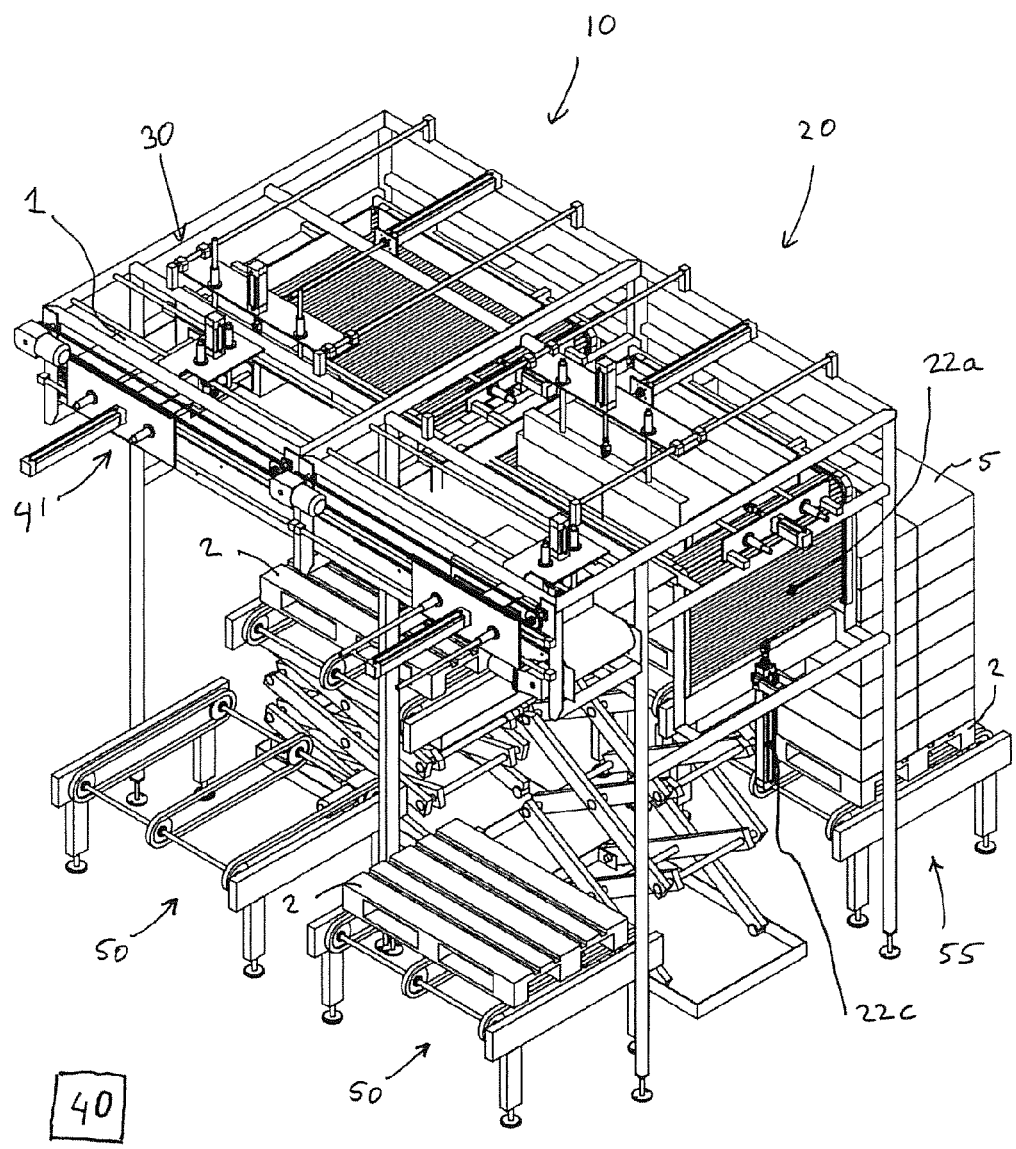

(51) Int. Cl.
*B65G 57/24* (2006.01)
*B65G 57/00* (2006.01)
*B65G 57/03* (2006.01)

(52) U.S. Cl.
CPC ......... *B65G 57/005* (2013.01); *B65G 57/035* (2013.01); *B65G 57/245* (2013.01); *B65G 2201/025* (2013.01); *B65G 2201/0267* (2013.01); *B65G 2814/0307* (2013.01)

(58) Field of Classification Search
USPC ..................................................... 414/790.9
See application file for complete search history.

(56) References Cited

U.S. PATENT DOCUMENTS

| | | | | | |
|---|---|---|---|---|---|
| 3,836,018 | A * | 9/1974 | Dawson | ................ | B65G 57/04 414/790.4 |
| 4,242,024 | A * | 12/1980 | Buta | .................... | B65G 57/035 271/213 |
| 4,439,084 | A * | 3/1984 | Werkheiser | .......... | B65G 57/245 414/792 |
| 4,976,584 | A * | 12/1990 | Focke | .................... | B65G 61/00 414/789.6 |
| 5,051,058 | A * | 9/1991 | Roth | .................... | B65G 57/035 414/676 |
| 5,372,472 | A * | 12/1994 | Winski | ................ | B65G 47/086 414/789.6 |
| 5,803,703 | A | 9/1998 | Winski | | |
| 5,957,653 | A * | 9/1999 | Nishitani | ............ | B65G 57/035 414/788.4 |
| 7,559,737 | B2 * | 7/2009 | Ray | ........................ | B65G 57/03 198/418.3 |
| 8,092,144 | B2 * | 1/2012 | Germain | ................ | B65G 57/24 198/431 |
| 2017/0121132 | A1 * | 5/2017 | Overley | ............... | B65G 57/035 |
| 2017/0183171 | A1 * | 6/2017 | Hannessen | .......... | B65G 57/035 |

* cited by examiner

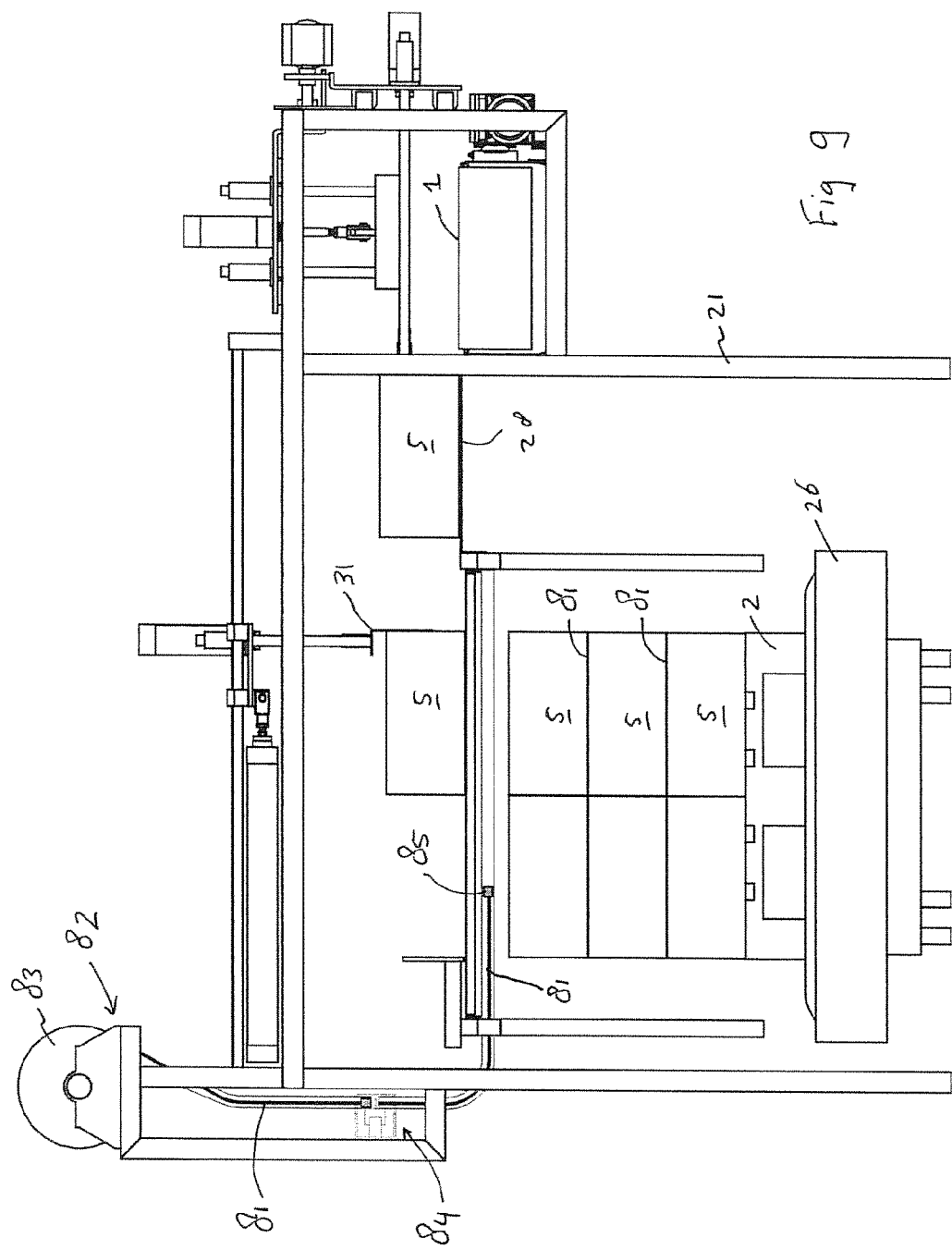

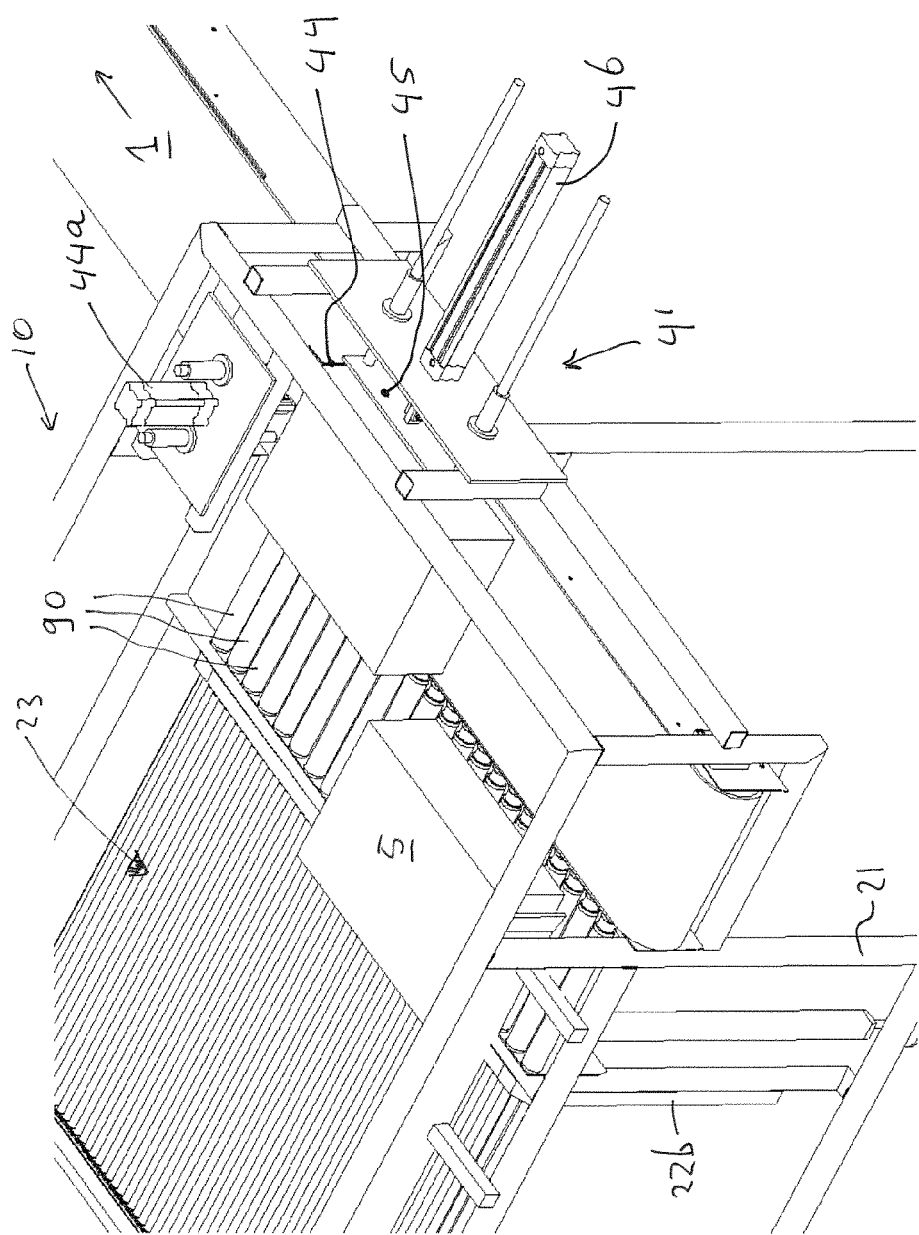

PALLETIZING INSTALLATION AND A METHOD FOR PALLETIZING

The present invention relates to the field of stacking layers of products, e.g. boxes, onto pallets.

In a known installation, e.g. as described in JPH01110427, a feed conveyor is present that is adapted to feed single products. Further a palletizing device is provided with is arranged to receive products from the feed conveyor and adapted to stack multiple layers of the products onto a pallet. This palletizing device comprises a frame, a shutter device, and a pallet lifter. The shutter device is stationary mounted in the frame and has a closed state and an opened state. In the closed state the shutter device provides a layer formation surface adapted to form thereon a layer of products. When brought into the opened state the formed layer of products falls. The pallet lifter comprises a pallet lifting table that is adapted to support a pallet thereon. A corresponding pallet lifting drive is adapted to move the pallet lifting table in a vertical range below the shutter device. The pallet lifting table is movable into an upper position and one or more lower positions, wherein in the upper position the pallet on the pallet lifting table is arranged underneath the shutter device so that upon bringing the shutter device in its opened state a layer of products falls and is received on the pallet, and wherein, after receiving a layer of products, the pallet lifting table is movable into a lower position so that layers of products can be stacked onto the pallet.

In many situation wherein palletizing installation is employed the handling of products commonly requires the presence of one or more significantly sized product buffers between the source of the products and the palletizing device or palletizing devices. Such buffers take up valuable floor space, especially if the products are to be kept at a cold temperature, e.g. with perishable food products. This may be the case when all products are rather similar in dimensions, e.g. boxes of similar height and possibly also similar contour, but may also be the case when a mix of different products has to be handled, e.g. products differing in cross-section, height, shape, etc. The latter may, for example, require that layers of products are to be stacked into a pallet that differ in height, e.g. a layer of lower products is followed by a layer of products having a greater height.

It is an aim of the present invention to provide an installation that allows for a more efficient handling of products to be palletized, e.g. allowing for elimination or at least reduction of the need for buffering between the source of the products and the palletizing devices.

It is a further aim of the present invention to provide an installation that takes up limited floor space, e.g. of particular relevance when placed in a conditioned cooling room, for example getting a minimum palletizing area for each pallet, for example by placing less demands on buffering of products ahead of the palletizing.

It is a further aim of the present invention to provide an installation that is structurally simple and reliable, e.g. allowing expansion of an installation to more palletizing positions in an effective manner and reducing costs for procurement and maintenance.

A further aim is to provide a fast and flexible method for changing the type of product and type of pallet in a single palletizer.

The present invention achieves one or more of the above aims by providing an installation according to the preamble of claim 1, which is characterized in that the installation comprises a first palletizing device and a second palletizing device, wherein the feed conveyor is a linear common feed conveyor adapted to feed single products in succession in a direction of conveyance, preferably at a constant conveyor speed, and wherein the first palletizing device and the second palletizing device are arranged alongside the common feed conveyor, the second palletizing device downstream the first palletizing device, preferably in side-by-side arrangement, wherein each palletizing device further comprises:
a row formation platform adapted to form thereon a row of products, which platform is mounted stationary in the frame and has opposed first and second lateral sides, wherein said first lateral side extends adjacent a lateral side of the common feed conveyor and at a height level corresponding to the height level of the common feed conveyor, wherein the platform has a length parallel to said common feed conveyor and a width perpendicular to said length, wherein the row formation platform provides a series of product locations along the length thereof to receive thereon a series of products forming a row of products, and in that the shutter device of each palletizing device is mounted stationary in the frame adjacent said second lateral side of the row formation platform, such that—in the closed state—the layer formation surface is at a height level corresponding to the row formation platform, wherein the width of the row formation platform is smaller than a corresponding width of the layer formation surface, and in that each palletizing device further comprises a product row transfer mechanism that is adapted to slide a row of products from the row formation platform onto the layer formation surface of the shutter device in closed state, and in that the installation further comprises a product ejector system with a controller and one or more product ejector devices controlled by said controller, which one or more product ejector devices are arranged near the row formation platforms and are adapted to eject a product from the common feed conveyor such that the product moves onto a selected product location of said at least two row formation platforms.

In a practical embodiment the controller is a computerized controlled running a program that governs the stacking of products onto each pallet.

The controller decides onto which product location of which row formation platform a product that is conveyed by the common feed conveyor is to be placed. If this is on the platform of the second, downstream, palletizing device, the particular product will pass along the first palletizing device until it reaches the second palletizing device. The ejector device is then operated accordingly so that the product is moved into the desired product location. Once a row of products is completed, the row transfer mechanism is operated and the row is moved onto the layer formation surface that is provided by the shutter device in its closed state. Once the layer is completed, by placement of multiple rows onto the layer formation surface, the shutter is brought into its opened state and the layer drops onto the pallet or the uppermost layer of any layers already stacked on the pallet. This process is continued until the pallet is deemed full. Then the full pallet is removed and replaced by another pallet.

The installation for example may be of use in situations where a pallet is to be filled with similar shape products, e.g. boxes of the same height and possibly also of the same peripheral contour. But the installation may also be used to handle a mixed stream of products with different dimensions and shapes, e.g. different heights, e.g. the one palletizing device being at a certain moment in use to form a layer of one type of products, e.g. of lower height products, and the other palletizing device being simultaneously used to form a layer of a different type of products, e.g. of higher products. As indicated this is an example of the enhanced versatility that reduces the need for buffering and possibly for different feed conveyors compared to existing installations.

The design of the palletizing devices is advantageous as the products that are ejected from the common feed conveyor are received on the row formation platform adjacent the common feed conveyor, which can in a practical embodiment be a simple stationary mounted plate or similar stationary platform surface. The row formation platform only has, in its simplest form, to receive thereon a row of products.

In another embodiment the row formation platform comprises a longitudinal direction product conveyor adapted to displace one or more products in longitudinal direction over the row formation platform. For example the longitudinal direction product conveyor is combined with a fixed position product stop which is mounted at a fixed, stationary position relative to the frame and stops all products that are to be ejected from the feed conveyor onto the row formation platform at a fixed position relative to the direction of conveyance of the feed conveyor, e.g. at a most downstream product location of the row formation platform. By operation of the longitudinal direction product conveyor an ejected product can then be moved to the desired product location on the row formation platform.

For example the row formation platform is provided with a series of rollers forming the surface of the row formation platform on which the products stand, with the rollers e.g. each having a rotation axis at right angles to the longitudinal direction of the row formation platform. The motion of a product in the longitudinal direction may be caused rollers being driven by a corresponding roller drive or by means of a pusher device or the like adapted to move the product or products in longitudinal direction over the row formation platform.

For example the row formation platform is provided with one or more movable belts extending in longitudinal direction of the platform and adapted to move or more products on the platform in longitudinal direction to a desired product location in view of the formation of the row of products.

The formation of the layer by combining several rows of products is done on the shutter device, which means that the row formation platform can have a limited width, which is beneficial in view of floor space.

As is preferred, the feed conveyor is adapted to convey the products at a constant speed of conveyance, so without any stopping and starting in view of the ejection of a product from the common feed conveyor. This greatly enhances the operating speed of the installation.

In a preferred embodiment the feed conveyor is a conveyor providing a moving and continuous conveyor surface, e.g. a belt or (flexible) chain conveyor, on which the products stand in succession.

In an embodiment thereof each ejector devices comprises an actuated product stop that is positioned or positionable relative to a product location on a row formation platform. The product stop is adapted to stop a selected product whilst the conveyor surface remains in motion to convey other products thereon.

In an embodiment the product stop comprises a movable product stop carrier that is longitudinally displaceable along the feed conveyor in the region of one or of multiple adjacent row formation platforms by a corresponding drive linked to the controller of the product ejector system, and the product stop further comprises a movable stop member that is movable relative to the movable product stop carrier by a further drive linked to the controller of the product ejector system between a retracted and an active position, e.g. movable up and down with the lowered stop blocking the path of a product on the conveyor.

The drive of the movable product stop carrier can for example be a screw spindle or a toothed belt drive.

The movable product stop carrier can for example be guided along one or more longitudinal guide rails on the frame.

In another embodiment it is envisaged that the product stop is mounted at a fixed, stationary position relative to the frame in order to stop all products that are to be ejected from the feed conveyor onto a row formation platform at a fixed position relative to the direction of conveyance of the feed conveyor, e.g. at a most downstream product location of the row formation platform. In this embodiment, as is preferred, the product stop may also include a movable stop member that is movable by a further drive linked to the controller of the product ejector system between a retracted and an active position, e.g. movable up and down with the lowered stop member blocking the path of a product on the conveyor. By provision and operation of a longitudinal direction product conveyor on the row formation platform a product ejected at said fixed position onto the platform can then be moved to the desired product location on the row formation platform.

In an embodiment each ejector device comprises an actuated lateral displacement member adapted to engage on a product that has been stopped by a product stop. The lateral displacement member is adapted to move the product laterally onto the product location of the row formation platform, preferably at such a speed that the conveyor is operated at a constant conveyance speed and then without the lateral displacement member interfering with following products.

For example the product stop includes a movable product stop carrier that is longitudinally displaceable along the feed conveyor in the region of one or of multiple adjacent row formation platforms and this carrier is also provided with an actuated lateral displacement member adapted to engage on a product that has been stopped by the product stop. This allows to align the stop member to be aligned with the desired product location of the row formation platform, e.g. said platform having a stationary plate as receiving surface for the products.

It will be appreciated that if the product stop is embodied as a fixedly mounted product stop as discussed herein the lateral displacement member may also be mounted at said fixedly mounted product stop.

It will be appreciated that in an embodiment the stop member can be integrated with the lateral displacement member, so that one and the same member causes the stopping of the product on the feed conveyor and the lateral displacement of the product onto the row formation platform.

In an embodiment the common feed conveyor comprises a series of product carriers that are moved along a corresponding track, e.g. product carrier being adapted to carry a single item. For example a tilting trays carrier having a series of trays that are individually tiltable on command so that the product thereon slides from the tray onto the desired product location on the row formation platform. In the latter embodiment the tilt mechanism causing the controlled tilting of each tray embodies the ejector device of the installation. In yet another embodiment product carriers are suspended from an overhead rail, e.g. as disclosed in WO2010/085141. In embodiments of a conveyor with product carrier movable along a rail, e.g. as in WO2010/085141, each product carrier is provided with a horizontal support surface for a product and with a slider that is movable to eject the product from the product carrier.

In an embodiment the row transfer mechanism that causes the formed row to be moved from the row formation platform onto the layer formation surface provided with by the shutter device comprises an actuated pusher bar having a length parallel to the row formation platform and a pusher bar drive adapted to position the bar in an initial engagement position against the row of products at the side thereof facing the common conveyor, preferably without the row transfer mechanism interfering with conveyance of products by the common feed conveyor. The pusher bar drive is adapted to push the row of products onto the layer formation surface formed by the shutter device. It is envisaged that in an embodiment the pusher bar is only moved to push the row of products just onto the layer formation surface, with any subsequent row effectively pushing an earlier row further over the layer formation surface. This approach allows for a relative limited motion of the pusher bar in said direction. In another embodiment the pusher bar is moved over the layer formation platform till a position wherein a first row is positioned vertically above the desired location on the pallet. This avoids that at a later stage the pusher bar not only has to move a later formed row of products onto the surface, but also would have to slide an earlier formed row further onto the layer formation surface. This can e.g. be advantageous for fragile and/or heavy products or if it is desired to make gaps in the layer in the thrust direction of pusher bar.

In an embodiment the pusher bar drive comprises a vertical actuator adapted to move the pusher bar between a raised position and a lower operating position, so that the pusher bar can pass over the row of products on the row formation platform when moving towards the initial engagement position, and then lowered into said initial engagement position, and further comprises a horizontal actuator adapted to move the pusher bar horizontally, so that the pusher bar can move the engaged row of products onto the layer formation surface.

In an embodiment each palletizing device is further provided with one or more actuated layer compacting members that are adapted to engage on one or more sides of the layer of products supported on the layer formation surface and can be are actuated to press the layer into a more compact layer. For example two compacting members are arranged on opposed sides of the layer formation surface, perpendicular to the length of the row formation platform, and movable towards one another to press the layer into a more compact layer. For example each layer compacting member comprises a bar that engages on the layer of products and that is translated by a corresponding drive, e.g. one or more fluid cylinders, e.g. pneumatic cylinders.

In a preferred embodiment the shutter device is a roller blind shutter device with at least one roller blind member forming the layer formation surface and guided between opposed roller blind guides and with a roller blind actuator adapted to move the roller blind member between a closed and opened position. In another embodiment the shutter device is embodied with one or more shutter panels that are movable in a horizontal plane between a closed and opened position. For example the shutter device comprises one or more fluid cylinders, e.g. pneumatic cylinders, as actuators for opening and closing the shutter device.

In an embodiment the roller blind shutter device comprises two roller blind members that are adapted to move in opposition directions towards their respective opened position and that adjoin one another in the closed position thereof along a join that lies in a central region of the layer formation surface, e.g. said join being perpendicular to the row formation platform. In an embodiment thereof each roller blind guide has an inverted U-shape with a horizontal leg between downward depending legs, so that the roller blind member is guided into a vertical opened position.

For example a pneumatic or hydraulic linear cylinder is provided to move each roller blind member between its opened and closed position.

In an embodiment each palletizing device is provided with an interlayer sheet mechanism that is adapted to place an interlayer sheet over an uppermost layer of the one or more layers stacked on a pallet prior to a further layer being stacked on top of the interlayer sheet This mechanism may comprise a magazine adapted to hold a supply of preformed sheets and a sheet transfer device operable to remove a sheet from the magazine and place the sheet on top of the uppermost layer of products on the platform, underneath the shutter device.

In a preferred embodiment the interlayer sheet mechanism comprises a coil holder adapted to hold a coil of interlayer sheet material and a cutting device adapted to cut an interlayer sheet from the coil. In yet another embodiment of a continuous web type of sheet material instead of a coil of sheet material a zigzag folded sheet material is supplied, with each sheet being cut from the zigzag folded supply prior to or after placement of the sheet over the uppermost stacked layer.

In an embodiment wherein a continuous web of sheet material is used, the interlayer sheet mechanism may comprise one or more mobile sheet material grippers adapted to grip the sheet material and pull the sheet material over the uppermost layer, wherein the cutting device is adapted to cut the interlayer sheet from the continuous web. In an embodiment thereof the coil holder is arranged on the frame opposite from the side of the frame where the row formation platform is mounted.

In an embodiment the installation comprises a pallet conveyor, at least adapted to convey a pallet with layers of products stacked thereon away from each of the palletizing devices, preferably the pallet lifting table being provided with a pallet shifter to shift the pallet onto the pallet conveyor.

In an embodiment each palletizing device is provided with a loaded pallet storage device arranged adjacent the pallet lifter and embodied to receive a loaded pallet from the pallet lifter and to temporarily store the loaded pallet, e.g. prior to further transportation of the loaded pallet by a pallet conveyor.

In an embodiment the installation the common feed conveyor ends at the downstream end of the last, e.g. second, palletizing device arranged alongside said feed conveyor, wherein the controller is embodied, e.g. programmed, to ensure that each product conveyed towards the series of palletizing devices is ejected onto a row formation platform of one of said palletizing devices. In another embodiment the common feed conveyor is embodied to continue beyond the last of the palletizing devices, e.g. embodied to form a loop allowing a product to be passed more than once along all palletizing devices or, e.g., allowing misidentified products to leave the palletizing circuit.

In a preferred embodiment the common feed conveyor has a rectilinear and horizontal section with said at least two palletizing devices being arranged side-by-side alongside said rectilinear and horizontal section.

In an embodiment the installation comprises a row of at least four palletizing devices in side-by-side arrangement with one group of palletizing devices having a row formation platform at one side thereof and the other group of palletizing devices having a row formation platform at an opposite side, wherein the installation further comprises two common feed conveyors, each having a rectilinear and horizontal section extending along a corresponding side of said row of palletizing devices.

In an embodiment the installation comprises a row of at least four palletizing devices in side-by-side arrangement with at least four palletizing devices having a row formation platform at the same side thereof, wherein the installation further comprises two common feed conveyors, each having a rectilinear and horizontal section, which sections extend in line with one another such that products are conveyed in opposite directions by said two common fed conveyors.

In an embodiment the installation comprises a product rotator arranged upstream of a palletizing device, preferably upstream of the first palletizing device, and adapted to rotate a product about a vertical axis in view of the placement of the product in the row of products. It is noted that such rotators are common in the field of palletizing installations. The rotator may, e.g., include a movable obstacle against which a product conveyed on the conveyor collides causing the product to rotate in the desired direction when the obstacle is in its deployed position. Or the rotator may include one or more product engaging members that are mobile about a vertical axis and entrain the product when the rotator is operated so that the product is rotated.

The invention also relates to a method for palletizing products wherein use is made of an installation as disclosed herein.

A second aspect of the present invention relates to a palletizing device having one or more of the aspects of the palletizing device described herein, either embodied to be used in the installation described above or embodied for use in an alternative installation, e.g. in an installation having a single palletizing device in combination with a feed conveyor.

The palletizing device of the second aspect of the invention is adapted to receive products from a feed conveyor and adapted to stack multiple layers of the products onto a pallet. The palletizing device comprises:
  a frame,
  a shutter device having a closed state and an opened state, wherein the shutter device in the closed state thereof provides a layer formation surface adapted to form thereon a layer of products, and wherein the shutter device in the opened state thereof allows said layer of products to fall,
which palletizing device of the second aspect of the invention further comprises one or more of the features below:
  the shutter device being mounted stationary in the frame,
  the palletizing device having a pallet lifter comprising:
    a pallet lifting table adapted to support a pallet thereon,
    a pallet lifting drive adapted to move the pallet lifting table in a vertical range below the shutter device,
    wherein the pallet lifting table is movable into an upper position and one or more lower positions, wherein in the upper position the pallet on the pallet lifting table is arranged underneath the shutter device so that upon bringing the shutter device in its opened state a layer of products falls and is received on the pallet, and wherein, after receiving a layer of products, the pallet lifting table is movable into a lower position so that layers of products can be stacked onto the pallet,
  a row formation platform adapted to form thereon a row of products, which platform is mounted stationary in the frame and has opposed first and second lateral sides, wherein said first lateral side is adapted to extend adjacent a lateral side of a feed conveyor and at a height level corresponding to the height level of the feed conveyor, wherein the platform has a length parallel to said feed conveyor and a width perpendicular to said length, wherein the row formation platform provides a series of product locations along the length thereof to receive thereon a series of products forming a row of products, wherein, preferably, the shutter device is mounted stationary in the frame adjacent said second lateral side of the row formation platform, such that— in the closed state—the layer formation surface is at a height level corresponding to the row formation platform, and wherein, preferably, the width of the row formation platform is smaller than a corresponding width of the layer formation surface,
  the palletizing device being associated with a product ejector system with a controller and one or more product ejector devices controlled by said controller, which one or more product ejector devices are arranged near the row formation platform and are adapted to eject a product from a feed conveyor passing alongside the row formation platform such that the product moves onto a selected product location of said row formation platform,
  each ejector device comprises an actuated product stop that is positioned or positionable relative to a product location on a row formation platform, which product stop is adapted to stop a selected product whilst the conveyor surface remains in motion to convey other products, and wherein each ejector devices comprises an actuated product lateral displacement member adapted to engage on stopped product and to move the product laterally onto the product location.
  a product row transfer mechanism that is adapted to slide a row of products from the row formation platform onto the layer formation surface of the shutter device in closed state,
  the product row transfer mechanism comprising an actuated pusher bar having a length parallel to the row formation platform and a pusher bar drive adapted to position the bar in an initial engagement position against the row of products at the side facing the common conveyor, preferably without the row transfer mechanism interfering with conveyance of products by the common feed conveyor, and the pusher bar drive being adapted to push the row of products onto the layer formation surface formed by the shutter device,
  the pusher bar drive comprises a vertical actuator adapted to move the pusher bar between a raised position and a lower operating position, so that the pusher bar can pass over the row of products on the row formation platform when moving towards the initial engagement position, and then lowered into said initial engagement position, and a horizontal actuator adapted to move the pusher bar horizontally, so that the pusher bar can move the engaged row of products onto the layer formation surface,
  the palletizing device being further provided with one or more actuated layer compacting members that are adapted to engage on one or more sides of the layer of products supported on the layer formation surface and can be are actuated to press the layer into a more compact layer, the shutter device being a roller blind shutter device with at least one roller blind member guided between opposed roller blind guides and with an roller blind actuator adapted to move the roller blind member between a closed and opened position, the shutter device comprising two roller blind members that are adapted to move in opposition directions towards their respective opened position and that adjoin one another in the closed position thereof along a join that lies in a central region of the layer formation surface, e.g. said join being perpendicular to the row formation platform, wherein, preferably, each roller blind guide has an inverted U-shape with a horizontal leg between downward depending legs, so that the roller blind member is guided into a vertical opened position, the palletizing device being provided with an interlayer sheet mechanism that is adapted to place an interlayer sheet over an uppermost layer of the one or more layers stacked on a pallet prior to a further layer being stacked on top of the interlayer sheet, preferably the interlayer sheet mechanism comprises a coil holder adapted to hold a coil of interlayer sheet material and a cutting device adapted to cut an interlayer sheet from the coil, For example one can envisage that the palletizing device does not have a pallet lifter but is provided with a vertically movable shutter device such that the shutter device is movable in a vertical range above the pallet and is raised every time a further layer has been placed onto the pallet. Whilst this is perceived as slower than the embodiment as in claim 1 with a stationary shutter and pallet lifter, this design may be suitable for lower capacity demands. Possibly the row formation platform is mobile in vertical direction along with the shutter device. In a further development one can envisage that the feed conveyor has a section extending along the row formation platform that is movable in height along with the shutter device and row formation platform. It will be appreciated that the latter mentioned embodiment is less attractive when the conveyor is a common feed conveyor feeding two palletizing devices in side-by-side arrangement as this would require the stacking of layers to be done simultaneously on both pallets.

For example one can envisage that the palletizing device does have a shutter device comprising two roller blind members that are adapted to move in opposition directions towards their respective opened position and that adjoin one another in the closed position thereof along a join that lies in a central region of the layer formation surface, e.g.—when provided with a row formation platform adjacent said layer formation surface—said join being perpendicular to the row formation platform. For example each roller blind guide then has an inverted U-shape with a horizontal leg between downward depending legs, so that the roller blind member is guided into a vertical opened position. For example each roller blind member is moved by a corresponding hydraulic or pneumatic linear cylinder.

For example one can envisage that the palletizing device is provided with an interlayer sheet mechanism that is adapted to place an interlayer sheet over an uppermost layer of the one or more layers stacked on a pallet prior to a further layer being stacked on top of the interlayer sheet, wherein the interlayer sheet mechanism comprises a coil holder adapted to hold a coil of interlayer sheet material and a cutting device adapted to cut an interlayer sheet from the coil, e.g. after the sheet has been placed over the uppermost layer stacked onto the pallet.

A third aspect of the invention relates to a palletizing installation comprising:
feed conveyor adapted to feed single products,
at least one palletizing device, each arranged to receive products from the feed conveyor and each adapted to stack multiple layers of the products onto a pallet, wherein a first palletizing device comprises:
a frame,
a shutter device having a closed state and an opened state, wherein the shutter device in the closed state thereof provides a layer formation surface adapted to form thereon a layer of products, and wherein the shutter device in the opened state thereof allows said layer of products to fall,
wherein the shutter device is mounted stationary in the frame,
a pallet lifter comprising:
a pallet lifting table adapted to support a pallet thereon,
a pallet lifting drive adapted to move the pallet lifting table in a vertical range below the shutter device,
wherein the pallet lifting table is movable into an upper position and one or more lower positions, wherein in the upper position the pallet on the pallet lifting table is arranged underneath the shutter device so that upon bringing the shutter device in its opened state a layer of products falls and is received on the pallet, and wherein, after receiving a layer of products, the pallet lifting table is movable into a lower position so that layers of products can be stacked onto the pallet,
characterized in that
the installation further comprises a second palletizing device,
wherein the feed conveyor is a linear common feed conveyor adapted to feed single products in succession in a direction of conveyance, preferably at a constant conveyor speed, and wherein the first palletizing device and the second palletizing device are arranged alongside the common feed conveyor, the second palletizing device downstream the first palletizing device, preferably in side-by-side arrangement,
wherein the first palletizing device further comprises:
a row formation platform adapted to form thereon a row of products, which platform is mounted stationary in the frame and has opposed first and second lateral sides, wherein said first lateral side extends adjacent a lateral side of the common feed conveyor and at a height level corresponding to the height level of the common feed conveyor, wherein the platform has a length parallel to said common feed conveyor and a width perpendicular to said length,
wherein the row formation platform provides a series of product locations along the length thereof to receive thereon a series of products forming a row of products, and in that the shutter device of the first palletizing device is mounted stationary in the frame adjacent said second lateral side of the row formation platform, such that—in the closed state—the layer formation surface is at a height level corresponding to the row formation platform,
wherein the width of the row formation platform is smaller than a corresponding width of the layer formation surface, and in that the first palletizing device further comprises a product row transfer mechanism that is adapted to slide a row of products from the row formation platform onto the layer formation surface of the shutter device in closed state, and in that the second palletizing device has a platform to receive one or more products thereon, which platform is mounted stationary and has opposed first and second lateral sides, wherein said first lateral side extends adjacent a lateral side of the common feed conveyor and at a height level corresponding to the height level of the common feed conveyor, wherein the platform has a length parallel to said common feed conveyor and a width perpendicular to said length, and in that the installation further comprises a product ejector system with a controller and one or more product ejector devices controlled by said controller, which one or more product ejector devices are arranged near the row formation platform of the first palletizing device and near the platform of the second palletizing device, and which ejector devices are adapted to eject a product from the common feed conveyor such that the product moves onto a selected product location of said platforms.

In the installation according to the third aspect of the invention the second palletizing device can be of a different type than the first palletizing device, so—for example—embodied as a pick and place robot arm type palletizing device with a robot arm and product gripper held by said arm allowing to stack layers of products onto a pallet. For example the robot arm is an articulated robot arm which allows to pick up a product, or a row of products, from the platform associated with the second palletizing device and place the product or products on the pallet. Such robot arm palletizing devices are generally known in the art and for example do not have a shutter device for layer building.

It will be appreciated that in a preferred version the second palletizing device is of the same type and basic structure as the first palletizing device according to the first aspect of the invention. Yet occasionally, e.g. when the product stream contains a fraction of the products that are better handled by another palletizing device than the first palletizing device, e.g. better handled by a pick and place robot arm type palletizing device, the third aspect of the invention may be practically advantageous as it still allows for optimal use of the first palletizing device and reduction of the need for buffering.

It will be appreciated that the features of the aspects of the inventions and examples or embodiments thereof as described above can be combined in various combinations.

Figure 2:
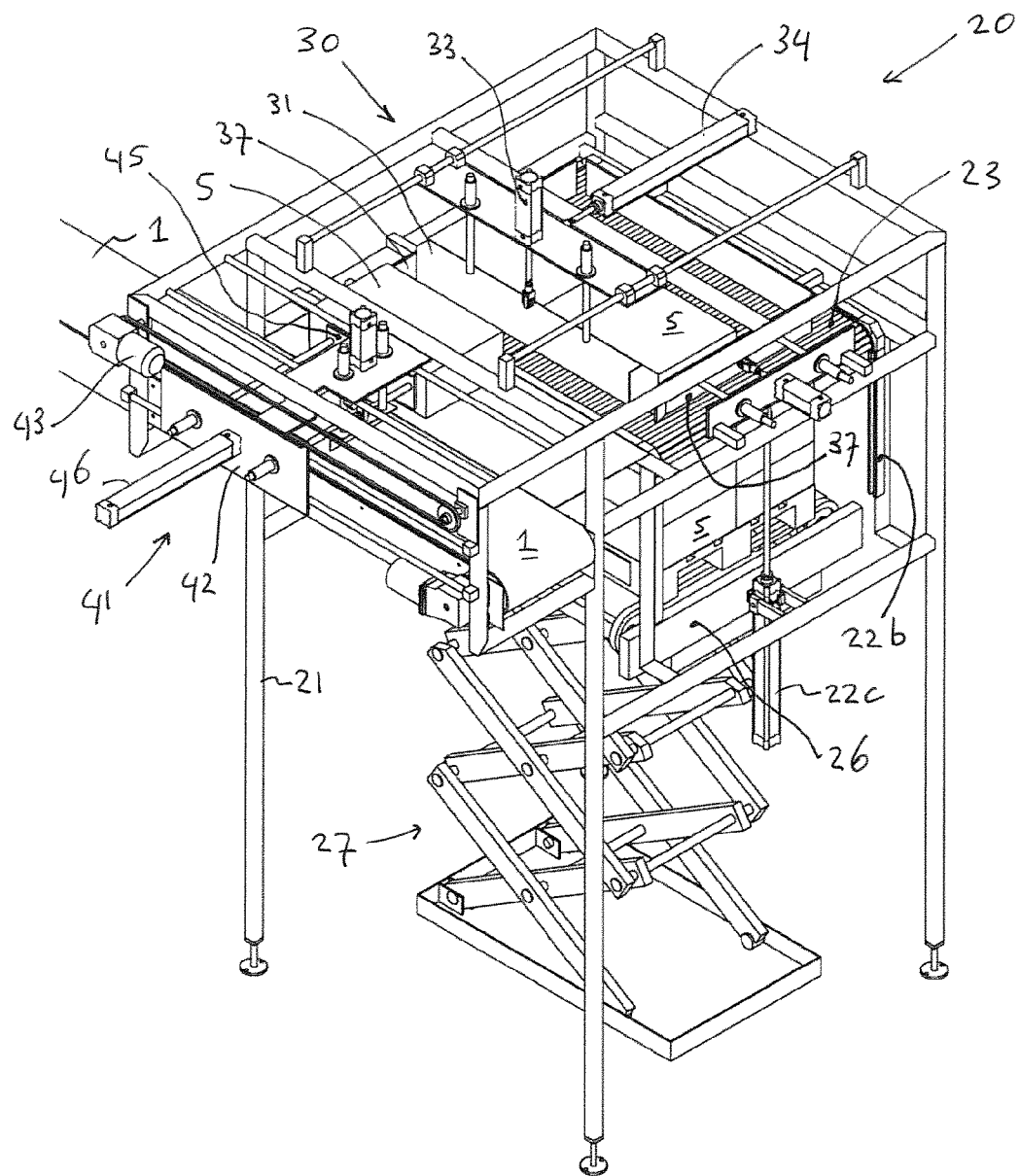
Figure 3:
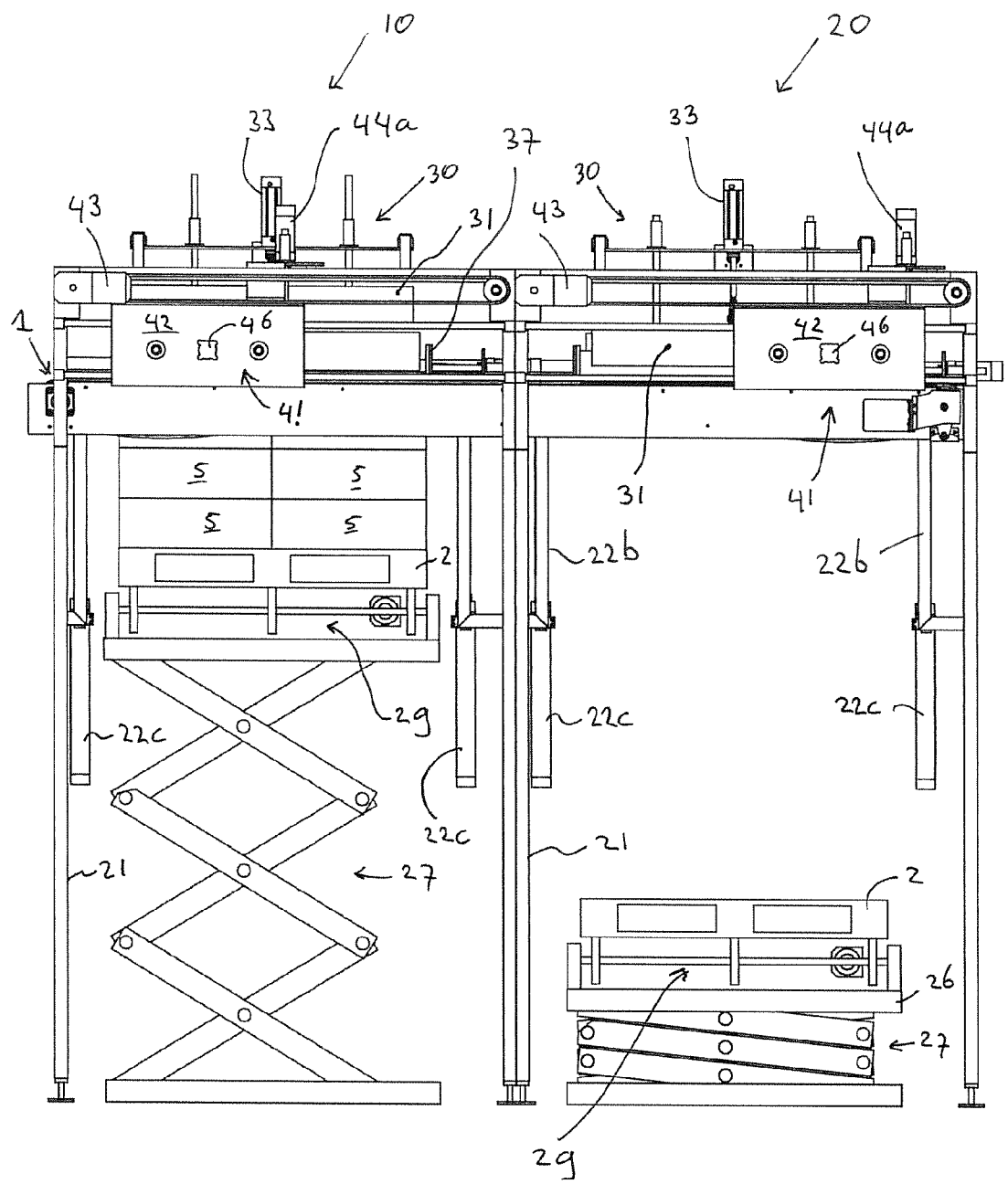
Figure 4:
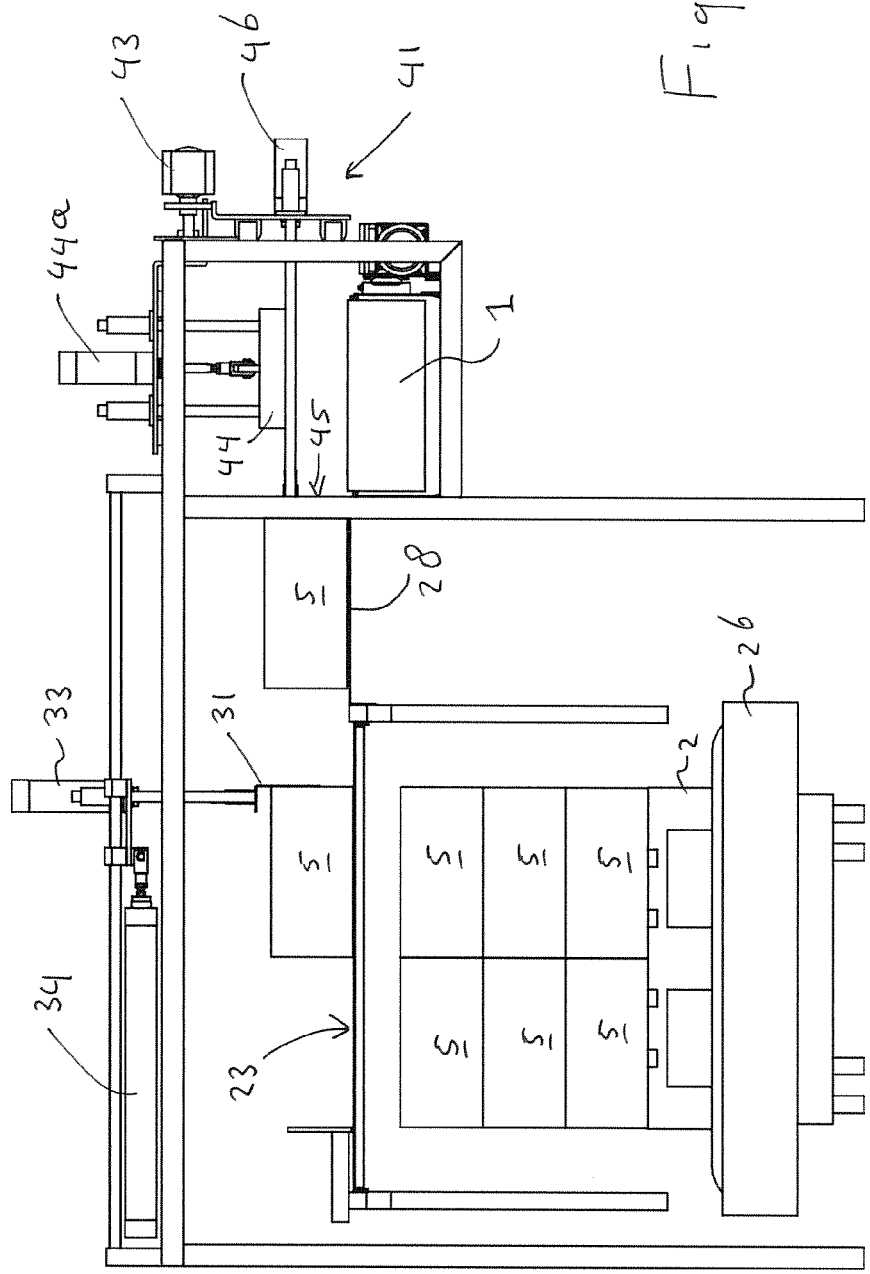
Figure 5:
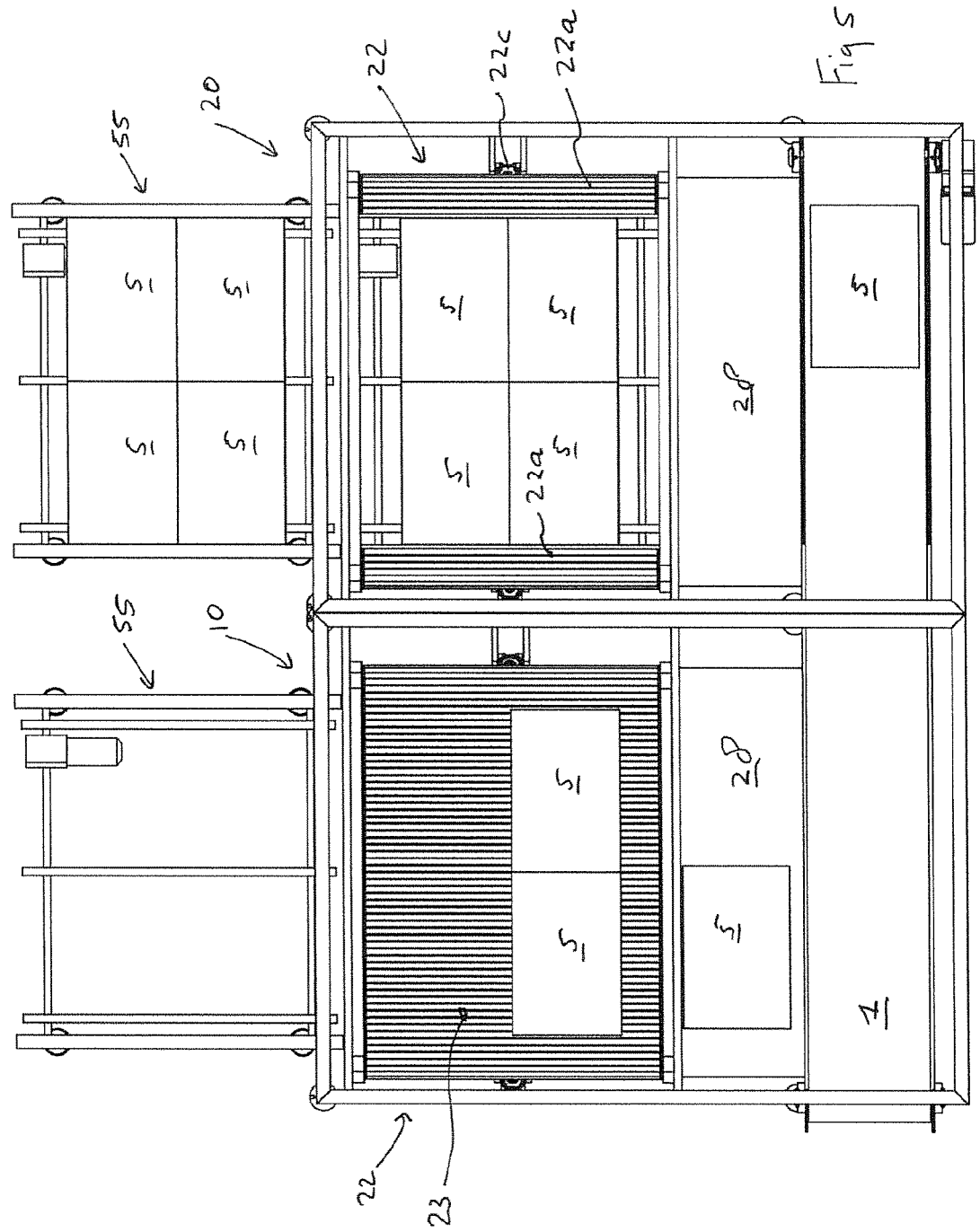
Figure 6:
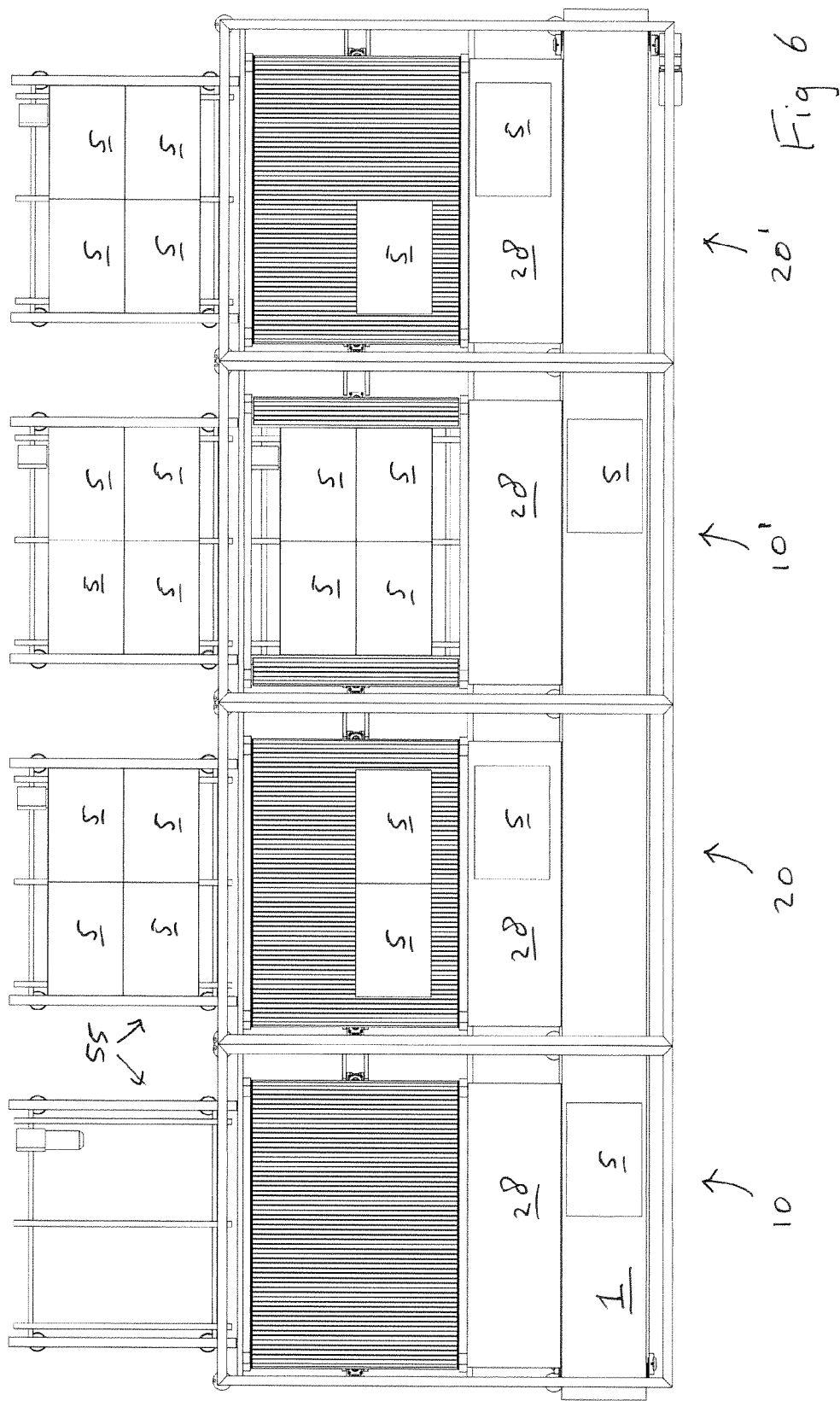
Figure 7:
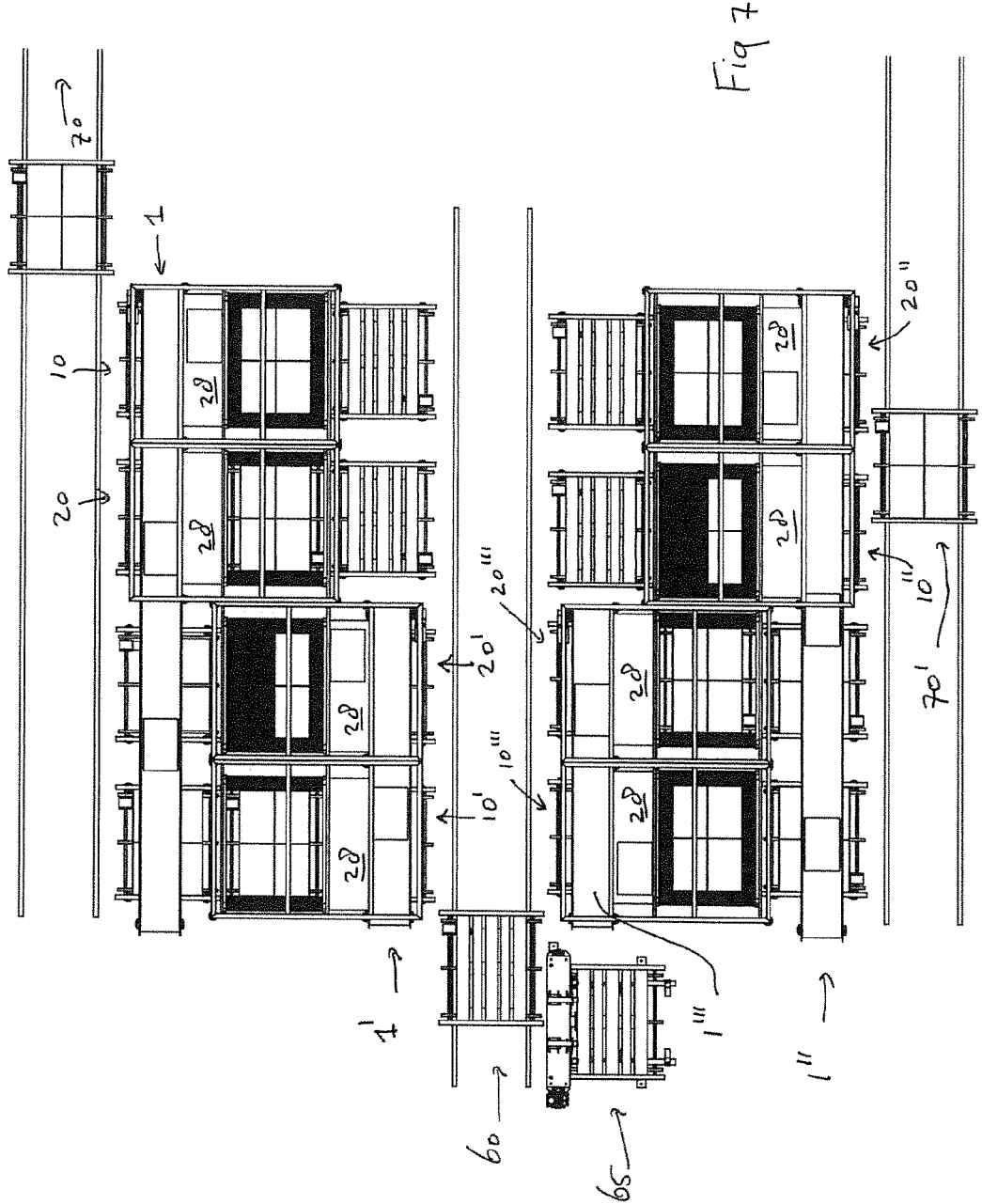
Figure 8:
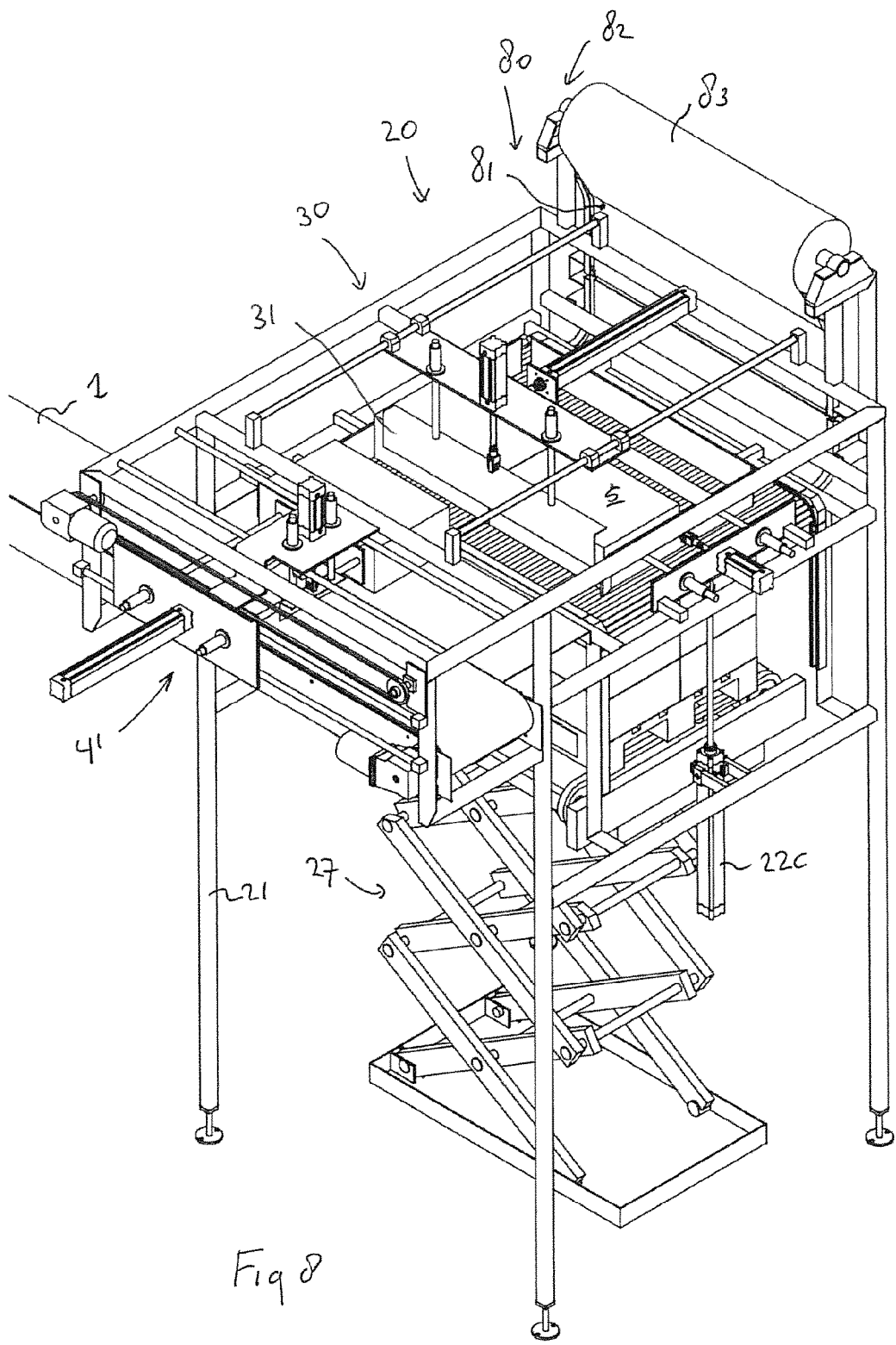

The invention will now be explained in more detail below with reference to the drawings. In the drawings:

FIG. 1 shows schematically in perspective view an embodiment of an installation according to the invention, FIG. 2 shows on a larger scale a part of the installation of FIG. 1, FIG. 3 shows in side view the two palletizing devices with the pallet lifter in uppermost and lowermost position respectively and with the shutter device in closed and opened state respectively, FIG. 4 shows a part of the installation of FIG. 1, FIG. 5 shows a schematic plan view of an installation according to the invention, FIG. 6 shows a schematic plan view of another installation according to the invention, FIG. 7 shows a schematic plan view of yet another installation according to the invention, FIG. 8 shows in a view corresponding to FIG. 2 an alternative embodiment of a palletizing device according to the invention, FIG. 9 shows in a view corresponding to FIG. 4 the embodiment of FIG. 8, FIG. 10 shows a detail of another embodiment of a palletizing device according to the invention.

With reference to FIGS. 1-5 now an embodiment of a palletizing installation according to the invention will be discussed.

As illustrated the installation comprises a common feed conveyor 1 that is adapted to feed single products 5, e.g. boxes, cartons or other containers (e.g. filled with food products, for example meat products) that are to be placed onto pallets 2 into the installation. The conveyor 1 is a linear common feed conveyor that is adapted to feed single products in succession in a direction of conveyance. Preferably the feed conveyor 1 is adapted and operated to feed the products at a constant conveyor speed.

In a practical embodiment the conveyor 1 is a belt conveyor or a series of end-to-end belt conveyors, each having a belt on which the products (here boxes) are standing.

The installation depicted here further comprises two palletizing devices 10, 20 of the same basic structure and operation in a side-by-side arrangement, generally alongside the feed conveyor 10 such that here the second palletizing device 20 is arranged downstream the first palletizing device when seen in direction of conveyance of the products. As will be explained the installation may well comprise more than two of such palletizing devices in side-by-side arrangement alongside a single common feed conveyor.

Each palletizing device 10, 20 is arranged to receive products 5 from the feed conveyor 1 and each is further adapted to stack multiple layers of the products onto a pallet 2.

As to illustrate the structure of the palletizing devices 10, 20 reference is made in particular here FIG. 2 showing device 20. As indicated above the device 10 in FIG. 1 is of the same basic structure and operation.

Each palletizing devices 10, 20 each comprises a frame 21, here with four vertical posts resting on the ground.

Each palletizing device 10, 20 further comprises a shutter device 22 having a closed state (see device 10 in FIGS. 1 and 5) and an opened state (see device 20 in FIGS. 1, 2, and 5). In the closed state thereof, as is known in the art, the shutter device 22 provides a layer formation surface 23 that is adapted to form thereon a layer of products 5. In the opened state the shutter device 22 no longer supports the layer of the products, so that it allows said layer of products to fall onto the pallet 2 or onto the uppermost layer that has already been stacked on the pallet.

The shutter device 22 is mounted stationary in the frame 21, so at a fixed height.

Each palletizing device 10, 20 further comprises a pallet lifter 25 which in turn comprises:
  a pallet lifting table 26 that is adapted to support a pallet 2 thereon, and
  a pallet lifting drive 27 adapted to move the pallet lifting table in a vertical range below the shutter device 22.

In the embodiment depicted here the drive 27 includes a scissors-mechanism as is known in the art with a scissor structure and a drive, e.g. a hydraulic drive. Other embodiment, e.g. with the table supported by means of one or more vertical spindles, hydraulic jacks, or suspended by one or more cables operated by a winch, etc., are also possible.

The pallet lifting table 26 is movable into an upper position and one or more lower positions, wherein in the upper position the pallet 2 on the pallet lifting table 26 is arranged underneath the shutter device 22 so that upon bringing the shutter device in its opened state a layer of products falls and is received on the pallet itself. After receiving a layer of products, the pallet lifting table 26 is moved into a lower position so that layers of products can be stacked onto the pallet. This operation is known in the art.

Each palletizing device 10, 20 further comprises a row formation platform 28 that is adapted to form thereon a row of products. This platform 28 is mounted stationary in the frame 21, so at a fixed height, and has opposed first and second lateral sides. The first lateral side extends adjacent a lateral side of the common feed conveyor 1 and at a height level corresponding to the height level of the common feed conveyor 1. The platform 28 has a length parallel to the common feed conveyor 1 and a width perpendicular to said length. The row formation platform 28 provides a series of product locations along the length thereof to receive thereon a series of products forming a row of products to be stacked onto the pallet.

The shutter device 22 of each palletizing device 10, 20 is mounted stationary in the frame 21 adjacent the second lateral side of the row formation platform, such that—in the closed state—the layer formation surface is at a height level corresponding to the row formation platform.

The width of the row formation platform 28 is smaller than a corresponding width of the layer formation surface 23 provided by the shutter device, e.g. just wide enough to receive thereon a single row of products.

The platform 28 can be a stationary plate, e.g. of metal. Preferably the platform is horizontal, non-sloping, but in an embodiment one can envisage that the platform has a slope, e.g. downward towards the shutter device surface. In more complex designs the platform may include a series of rollers or other friction reducing provisions in order to reduce friction of the products on the platform, e.g. allowing for the realignment into a neat row before being transferred onto the shutter device 22 which can, for example, be performed by a dedicated alignment pusher device or by providing a stop at one end of the platform and driving said rollers to urge the products in the direction of the stop.

As the platform 28 is at an elevated position in the frame of the device 10, 20, the conveyor 1 also it at said elevated height, preferably supported by the same frame 21.

Each palletizing device 10, 20 further comprises a product row transfer mechanism 30 that is adapted to slide a row of products from the row formation platform 28 onto the layer formation surface 23 of the shutter device 22 in its closed state.

The installation further comprises a product ejector system with a controller 40, e.g. a computerized controller loaded with a computer program to send appropriate instructions to the one or more product ejector devices 41 that are controlled by the controller. The one or more product ejector devices 41 are arranged near the row formation platforms 28 and are adapted to eject a product 5 from the common feed conveyor 1 such that the product moves onto a selected product location of said at least two row formation platforms 28.

As is preferred for practical reasons the common feed conveyor 1 is adapted to convey the products at a constant speed of conveyance.

As depicted by way of example here the product conveyor 1 is a conveyor providing a moving conveyor surface, e.g. a belt conveyor, on which the products 5 stand.

Each ejector device 41 comprises an actuated product stop that is positioned or positionable relative to a product location on a row formation platform 28, which product stop is adapted to stop a selected product 5 whilst the conveyor surface remains in motion to convey other products. Each ejector device 41 further comprises an actuated product lateral displacement member adapted to engage on stopped product and to move the product laterally onto the product location on the platform 28.

The installation further comprises a row transfer mechanism 30 which comprises actuated pusher bar 31 having a length parallel to the row formation platform and a pusher bar drive 32 adapted to position the bar in an initial engagement position against the row of products at the side thereof facing the common conveyor. Preferably the row transfer mechanism does not interfere with the conveyance of products by the common feed conveyor 1, and the pusher bar drive is adapted to push the row of products 5 onto the layer formation surface formed by the shutter device 22.

In the depicted embodiment the pusher bar drive 32 comprises a vertical actuator 33, here a fluid operated jack, e.g. a pneumatic cylinder, that is adapted to move the pusher bar 32 between a raised position and a lower operating position, so that the pusher bar 32 can pass over the row of products on the row formation platform when moving towards the initial engagement position, and then lowered into said initial engagement position, and a horizontal actuator 34, here a fluid operated jack, e.g. a pneumatic cylinder, or spindle, adapted to move the pusher bar horizontally, so that the pusher bar can move the engaged row of products onto the layer formation surface.

The figures also illustrate the provision of each palletizing device 10, 20 with one or more actuated layer compacting members 35 that are adapted to engage on one or more sides of the layer of products 5 supported on the layer formation surface and can be are actuated to press the layer into a more compact layer. This is common in the art of these devices.

In the embodiment depicted here the shutter device 22 is a roller blind shutter device with at least one roller blind member 22a guided between opposed roller blind guides 22b and with a roller blind actuator 22c adapted to move the roller blind member between a closed and opened position. Here, as is preferred, the guides 22b form inverted U shaped guides for side edges of the roller blind member 22a, with a main horizontal leg and downward depending legs along opposite sides of the frame so that the roller blind member is guided into a vertical opened position. As illustrated here, the actuators 22c may be embodied as linear jacks, e.g. pneumatic, that engage on a roller blind member to actuate said member.

It will be appreciated that the two roller blind members 22a are adapted to move in opposition directions towards their respective opened position and that they adjoin one another in the closed position thereof along a join that lies in a central region of the layer formation surface, e.g. said join being perpendicular to the row formation platform although a join parallel to said platform is also possible.

In more detail each of the depicted product ejector devices 41, in this embodiment, comprises a movable product stop carrier 42 that is movable to and fro in the direction of conveyance of the conveyor 1 by a corresponding carrier drive motor 43. In this embodiment the motor 43 operates a belt drive for the carrier 42. The drive motor 43 is linked to the controller 40 allowing to position the carrier 42 in alignment with the desired product location on the platform onto which the product is to be ejected from the feed conveyor.

The carrier 42 supports a movable stop member 44 that can be actuated by a corresponding drive, e.g. pneumatic cylinder, on command by the controller 40 between an operative position or mode in the path of the approaching product 5, so that the product 5 is stopped by said stop member 44, and a retracted or inactive position or mode (here a raised position by actuator 44a) wherein the stop member 44 is inactive and allows for the passage of the product 5 conveyed by the conveyor 10 pas the stop member, e.g. to pass along the first palletizing device 10 and then to be stopped by the stop member 44 corresponding to the second palletizing device. For example the retracted position is a position remote from the platform so that the product can pass. In another embodiment the retracted position is a tilted or pivoted position so that the product can pass.

Each carrier 42 further comprises a product lateral displacement member 45, e.g. a product pusher member 45 that is reciprocable at right angles to the direction of conveyance above the conveyor surface so as to engage on the stopped product. In this example each carrier 42 has a linear actuator 46, e.g. pneumatic cylinder, to move the corresponding pusher member 45.

The depicted system comprises said two ejector devices 41 as well as the common controller 40 thereof and allows to eject a product 5 from the common feed conveyor 1 such that the product 5 moves onto a selected product location of the two row formation platforms 28 that each have multiple product locations.

So each ejector device 41 comprises an actuated product stop member 44 that is positioned or positionable relative to a product location on a row formation platform 28, and which product stop 44 is adapted to stop a selected product 5 whilst the conveyor surface remains in motion to convey other products 5 thereon towards and along the devices 10, 20. Each ejector devices then further comprises an actuated product lateral displacement member 45 adapted to engage on stopped product and to move the product laterally onto the selected product location of the row formation platform.

In order to transfer a row of products that has been compiled on a platform 28 onto the corresponding shutter device 22 it is envisioned in an embodiment that the row transfer mechanism comprises actuated pusher bar 31 that has a length parallel to the row formation platform 28 and a pusher bar drive 32 that is adapted to position the bar 31 in an initial engagement position against the row of products at the side facing the common conveyor 1, preferably—as depicted here—without the row transfer mechanism interfering with conveyance of products by the common feed conveyor 1. The pusher bar drive 32 is then adapted to push the row of products from the platform 28 onto the layer formation surface 23 that is formed by the shutter device 22 in its closed position. As is preferred the pusher bar 31 is moved only so far that the row of products 5 is moved onto the shutter device, so that any row of products that has been placed on the shutter device at an earlier stage is slid further onto the shutter device.

As is preferred, the pusher bar drive 32 further comprises a vertical actuator 33 adapted to move the pusher bar 31 between a raised position and a lower operating position, so that the pusher bar 31 can pass over one or more products on the row formation platform 28 when moving towards the initial engagement position, and then lowered into the initial engagement position. A horizontal actuator 34 is adapted to move the pusher bar 31 horizontally, so that the pusher bar can move the engaged row of products onto the layer formation surface 23.

As is known in the art each palletizing device is further provided with one or more actuated layer compacting members 37 that are adapted to engage on one or more sides of the layer of products supported on the layer formation surface 23 and can be are actuated to press the layer into a more compact layer.

In practice the controller 40 will include a computer that is programmed, e.g. loaded with a software, adapted to determine for each product that is on its way to the palletizing installation the pallet onto which the product has to be placed taking into account the formation of rows on the platforms 28 of the devices 10, 20 for optimal efficiency. As is preferred and as is shown here each platform 28 is at least associated with one corresponding actuated product stop member 44 that is positioned or positionable relative to a product location on a row formation platform, and which product stop is adapted to stop a selected product whilst the conveyor surface of conveyor 1 remains in motion to convey other products thereon towards and along the devices. Also each ejector device 41 further comprises an actuated product lateral displacement member 45 that is adapted to engage on stopped product and to move the product laterally onto the selected product location on the selected platform. This allows for a continuous feed, preferably at constant speed, of products alongside the platforms 28 so that optimal capacity is achievable.

In an embodiment it is envisaged that not all products 5 that arrive at the entry of the installation are handled by the palletizing devices 10, 20 immediately, e.g. due to a temporary stop of one of the devices 10, 20. For such situations one can imagine that the conveyor extends even further past the devices 10, 20, e.g. so as to allow for the products to return again to the entry of the installation.

Once a layer of products 5 has been completed on the shutter device 22, the device 22 opens and the layer falls onto the pallet or any stack of one or more layers already present on the pallet 2. Then the pallet 2 is lowered by suitable operation of the scissors mechanism, which process is repeated until the pallet is sufficiently loaded.

As can be seen the pallet table 26 is provided with a pallet conveyor 29 allowing to move a pallet from and onto the table. Here the conveyor comprises a series of parallel tracks.

As can be seen in FIG. 1 new empty pallets 20 can be loaded into the devices 10, 20 by means of a pallet feeder device 50 that is arranged here underneath the conveyor 1 so that the pallet 2 is passed between the two front posts of the frame. At the rear of each device 10, 20 a pallet discharge device 55 is provided, so that a loaded pallet is passed between the rear posts of the frame 21.

If desired, and as known in the art, the feed conveyor 1 may at the entry into the installation be provided with a product rotator that is adapted to rotate a product about a vertical axis, e.g. by 90 degrees, in view of its placement on the pallet. It is also possible to provide one such product rotator per palletizing device when desired. In an embodiment the product stop member is embodied as a product rotator so that the stop member not only is adapted to stop the product at the desired location relative to the platform, but also to rotate the product about a vertical axis.

In FIG. 6 it is shown that more than two, here four palletizing devices 10, 20, 10', 20' may be arranged alongside a common feed conveyor 1, preferably said devices being in side-by-side arrangement so as to make optimum use of floor space and with the conveyor having a rectilinear section passing alongside said devices 10, 20, 10', 20'. In FIG. 6 the left-hand device 10 has no products on its shutter device and platform, with a single product being stopped on the conveyor 10 (stop member not shown here). The next device 20 shows a row of two products 5 on the shutter device 22 and a single product 5 on the platform 28. The next device 10' shows an open shutter device 22 so that a layer of products 5 is visible, stacked on a pallet. The last device 20' shows a single product on the shutter device 22 and a single product on the platform 28. Concerning the latter situation it is noted that the pusher bar 31 allows to transfer a complete row of products onto the shutter but if desired one can also shift an incomplete row onto the shutter device 22. This is possible if the controller 40 is able to memorize the incomplete row being shifted onto the shutter device and to make up said row, if possible, by suitably ejecting one or more additional products onto the corresponding platform. An incomplete row can also be applicable in case for example a top layer on the pallet will not be filled completely due to the number of products to be stacked onto the pallet.

In FIG. 7 it is illustrated that many different arrangement are possible with multiple side-by-side palletizing devices as discussed herein. In each group of four side-by-side palletizing devices 10, 20, 10', 20' and 10", 20", 10''', 20''', two of the devices have their platform 28 on one side and the other two at the other side so that this group of four is fed by two feed conveyors 1, 1' and 1", 1'''.

The groups of four palletizing devices each are separated by a central path where a pallet infeed conveyor 60 is provided which is adapted to feed empty pallets 2 to each of the palletizing devices. A pallet destacking device 65 is provided to take one pallet at a time from a stack of pallets that has been loaded into the device 65.

At the side opposite from the central path of each group of four palletizing devices there is provided a loaded pallet conveyor 70, 70' or outfeed conveyor allowing to discharge loaded pallets, e.g. to a storage room, e.g. a refrigerated storage room.

FIGS. 8 and 9 illustrate an embodiment of a palletizing device 10, 20 wherein, in addition to the structural features discussed herein, the device has an interlayer sheet mechanism 80 that is adapted to place an interlayer sheet 81 over an uppermost layer of the one or more layers stacked on a pallet 2 prior to a further layer being stacked on top of the interlayer sheet.

As shown here the interlayer sheet mechanism comprises a coil holder 82 that is adapted to hold a coil 83 of interlayer sheet material, e.g. paper, carton, plastic, and a cutting device 84 adapted to cut an interlayer sheet from the coil.

The interlayer sheet mechanism further comprises one or more mobile sheet material grippers 85 that are adapted to grip the sheet material 81 and pull the sheet material over the uppermost layer. The cutting device is then adapted to cut the interlayer sheet from the coil.

As can be seen, and as preferred, the coil holder 82 is arranged at an elevated position on the frame opposite from the side of the frame where the row formation platform 82 is mounted.

With reference to FIG. 10 other embodiments of the row formation platform and of the ejector device of a palletizing device will be discussed.

The row formation platform 28 is not embodied with a plate or other stationary surface for the row of products 5 to be formed thereon. Instead the platform 28 is provided with a series of rollers 90 each having axis of rotation at right angles to the longitudinal axis of the platform 28. It is envisaged—in this example—that one or more of the rollers 90 are provided with or connected with a drive, so that one or more rollers 90 are driven rollers. This allows for a product 5 to be moved in longitudinal direction over the platform 28 to a selected product location thereon.

The ejector device 41 is not provided with a carrier 42, and is instead embodied with a product stop that is—seen in longitudinal direction of the platform—mounted at a fixed, stationary position in order to stop all products that are to be ejected from the feed conveyor 1 onto the row formation platform 28 at a fixed position.

It is illustrated here that the product stop includes a movable stop member 44 that is movable by a drive 44a linked to the controller 40 of the product ejector system between a retracted and an active position, e.g. movable up and down with the lowered stop blocking the path of a product on the conveyor.

It is also illustrated that the ejector device 41 comprises an actuated product lateral displacement member 45 with corresponding actuator 46, which member 45 is adapted to engage on stopped product and to move the product laterally onto the platform, here always onto the same product location of the platform 28 from where the product 5 can be displaced by driving the one or more rollers 90 to a desired location in view of the row formation.

For example one or more movable blocking members (not shown) can be arranged in between adjacent rollers so that a blocking member in raised position blocks the further travel of a product 5 over the platform and in a lowered position allows the product 5 to pass onwards in longitudinal position of the platform.

Instead of driving one or more rollers 90 another drive for the product over the platform is also possible, e.g. with a pusher device engaging on a side of the product and moving the product in longitudinal direction of the platform, e.g. over non-driven rollers.

The invention claimed is:

1. A palletizing installation comprising:
   feed conveyor adapted to feed single products,
   at least one palletizing device, each arranged to receive products from the feed conveyor and each adapted to stack multiple layers of the products onto a pallet, wherein each palletizing device comprises:
      a frame,
      a shutter device having a closed state and an opened state, wherein the shutter device in the closed state thereof provides a layer formation surface adapted to form thereon a layer of products, and wherein the shutter device in the opened state thereof allows said layer of products to fall,
   wherein the shutter device is mounted stationary in the frame,
   a pallet lifter comprising:
      a pallet lifting table adapted to support a pallet thereon,
      a pallet lifting drive adapted to move the pallet lifting table in a vertical range below the shutter device,
   wherein the pallet lifting table is movable into an upper position and one or more lower positions, wherein in the upper position the pallet on the pallet lifting table is arranged underneath the shutter device so that upon bringing the shutter device in its opened state a layer of products falls and is received on the pallet, and wherein, after receiving a layer of products, the pallet lifting table is movable into a lower position so that layers of products can be stacked onto the pallet,
   wherein
   the installation comprises a first palletizing device and a second palletizing device,
      wherein the feed conveyor is a linear common feed conveyor adapted to feed single products in succession in a direction of conveyance, and wherein the first palletizing device and the second palletizing device are arranged alongside the common feed conveyor, the second palletizing device downstream the first palletizing device, wherein each palletizing device further comprises a row formation platform adapted to form thereon a row of products, which platform is mounted stationary in the frame and has opposed first and second lateral sides, wherein said first lateral side extends adjacent a lateral side of the common feed conveyor and at a height level corresponding to the height level of the common feed conveyor, wherein the platform has a length parallel to said common feed conveyor and a width perpendicular to said length, wherein the row formation platform provides a series of product locations along the length thereof to receive thereon a series of products forming a row of products, and the shutter device of each palletizing device is mounted stationary in the frame adjacent said second lateral side of the row formation platform, such that in the closed state the layer formation surface is at a height level corresponding to the row formation platform, wherein the width of the row formation platform is smaller than a corresponding width of the layer formation surface, and each palletizing device further comprises a product row transfer mechanism that is adapted to slide a row of products from the row formation platform onto the layer formation surface of the shutter device in closed state, and the installation further comprises a product ejector system with a controller and one or more product ejector devices controlled by said controller, which one or more product ejector devices are arranged near the row formation platforms and are adapted to eject a product from the common feed conveyor such that the product moves onto a selected product location of said at least two row formation platforms.

2. The installation according to claim 1, wherein the common feed conveyor is a conveyor providing a moving conveyor surface on which the products stand.

3. The installation according to claim 2, wherein each ejector device comprises a product stop including a movable stop member that is positioned or positionable relative to a product location on a row formation platform, which stop member is adapted to stop a selected product whilst the conveyor surface remains in motion to convey other products, and wherein each ejector device comprises an actuated product lateral displacement member adapted to engage on stopped product and to move the product laterally onto the product location.

4. The installation according to claim 2, wherein each ejector device comprises a product stop comprising a movable product stop carrier that is longitudinally displaceable along the feed conveyor in the region of one or of multiple adjacent row formation platforms by a corresponding drive linked to the controller of the product ejector system, and wherein the product stop further comprises a movable stop member that is movable relative to the movable product stop carrier by a further drive linked to the controller of the product ejector system between a retracted and an active position.

5. The installation according to claim 2, wherein each ejector device comprises a product stop, and wherein the product stop is mounted at a fixed, stationary position relative to the frame in order to stop all products that are to be ejected from the feed conveyor onto a row formation platform at a fixed position relative to the direction of conveyance of the feed conveyor, and wherein the product stop includes a movable stop member that is movable by a drive linked to the controller of the product ejector system between a retracted and an active position, and wherein the row formation platform is provided with longitudinal direction product conveyor that is adapted to move a product that has been ejected at said fixed position from the feed conveyor onto the platform in longitudinal direction to a desired product location on the row formation platform.

6. The installation according to claim 1, wherein each ejector device comprises a product stop including a movable stop member that is positioned or positionable relative to a product location on a row formation platform, which stop member is adapted to stop a selected product whilst the conveyor surface remains in motion to convey other products, and wherein each ejector device comprises an actuated product lateral displacement member adapted to engage on stopped product and to move the product laterally onto the product location.

7. The installation according to claim 1, wherein each ejector device comprises a product stop comprising a movable product stop carrier that is longitudinally displaceable along the feed conveyor in the region of one or of multiple adjacent row formation platforms by a corresponding drive linked to the controller of the product ejector system, and wherein the product stop further comprises a movable stop member that is movable relative to the movable product stop carrier by a further drive linked to the controller of the product ejector system between a retracted and an active position.

8. The installation according to claim 1, wherein each ejector device comprises a product stop, and wherein the product stop is mounted at a fixed, stationary position relative to the frame in order to stop all products that are to be ejected from the feed conveyor onto a row formation platform at a fixed position relative to the direction of conveyance of the feed conveyor, and wherein the product stop includes a movable stop member that is movable by a drive linked to the controller of the product ejector system between a retracted and an active position, and wherein the row formation platform is provided with longitudinal direction product conveyor that is adapted to move a product that has been ejected at said fixed position from the feed conveyor onto the platform in longitudinal direction to a desired product location on the row formation platform.

9. The installation according to claim 1, wherein the row transfer mechanism comprises actuated pusher bar having a length parallel to the row formation platform and a pusher bar drive adapted to position the bar in an initial engagement position against the row of products at the side facing the common conveyor, and the pusher bar drive being adapted to push the row of products onto the layer formation surface formed by the shutter device.

10. The installation according to claim 9, wherein the pusher bar drive comprises a vertical actuator adapted to move the pusher bar between a raised position and a lower operating position, so that the pusher bar can pass over the row of products on the row formation platform when moving towards the initial engagement position, and then lowered into said initial engagement position, and a horizontal actuator adapted to move the pusher bar horizontally, so that the pusher bar can move the engaged row of products onto the layer formation surface.

11. The installation according to claim 1, wherein each palletizing device is further provided with one or more actuated layer compacting members that are adapted to engage on one or more sides of the layer of products supported on the layer formation surface and can be are actuated to press the layer into a more compact layer.

12. The installation according to claim 1, wherein the shutter device is a roller blind shutter device with at least one roller blind member guided between opposed roller blind guides and with a roller blind actuator adapted to move the roller blind member between a closed and opened position.

13. The installation according to claim 12, wherein the shutter device comprises two roller blind members that are adapted to move in opposition directions towards their respective opened position and that adjoin one another in the closed position thereof along a join that lies in a central region of the layer formation surface.

14. The installation according to claim 13, wherein each roller blind guide has an inverted U-shape with a horizontal leg between downward depending legs, so that the roller blind member is guided into a vertical opened position.

15. The installation according to claim 1, wherein each palletizing device is provided with an interlayer sheet mechanism that is adapted to place an interlayer sheet over an uppermost layer of the one or more layers stacked on a pallet prior to a further layer being stacked on top of the interlayer sheet.

16. The installation according to claim 15, wherein the interlayer sheet mechanism comprises a coil holder adapted to hold a coil of interlayer sheet material and a cutting device adapted to cut an interlayer sheet from the coil, and wherein the interlayer sheet mechanism comprises one or more mobile sheet material grippers adapted to grip the sheet material and pull the sheet material over the uppermost layer, and wherein the cutting device is adapted to cut the interlayer sheet from the coil.

17. The installation according to claim 1, wherein the installation comprises a pallet conveyor, at least adapted to convey a pallet with layers of products stacked thereon away from each of the palletizing devices the pallet lifting table being provided with a pallet shifter to shift the pallet onto the pallet conveyor.

18. A method for palletizing products, the method comprising palletizing products using a palletizing installation, the palletizing installing comprising:
    feed conveyor adapted to feed single products,
    at least one palletizing device, each arranged to receive products from the feed conveyor and each adapted to stack multiple layers of the products onto a pallet, wherein each palletizing device comprises:
        a frame,
        a shutter device having a closed state and an opened state, wherein the shutter device in the closed state thereof provides a layer formation surface adapted to form thereon a layer of products, and wherein the shutter device in the opened state thereof allows said layer of products to fall,
    wherein the shutter device is mounted stationary in the frame,
    a pallet lifter comprising:
        a pallet lifting table adapted to support a pallet thereon,
        a pallet lifting drive adapted to move the pallet lifting table in a vertical range below the shutter device,
    wherein the pallet lifting table is movable into an upper position and one or more lower positions, wherein in the upper position the pallet on the pallet lifting table is arranged underneath the shutter device so that upon bringing the shutter device in its opened state a layer of products falls and is received on the pallet, and wherein, after receiving a layer of products, the pallet lifting table is movable into a lower position so that layers of products can be stacked onto the pallet,
wherein
the installation comprises a first palletizing device and a second palletizing device,
    wherein the feed conveyor is a linear common feed conveyor adapted to feed single products in succession in a direction of conveyance, and wherein the first palletizing device and the second palletizing device are arranged alongside the common feed conveyor, the second palletizing device downstream the first palletizing device,
    wherein each palletizing device further comprises a row formation platform adapted to form thereon a row of products, which platform is mounted stationary in the frame and has opposed first and second lateral sides, wherein said first lateral side extends adjacent a lateral side of the common feed conveyor and at a height level corresponding to the height level of the common feed conveyor, wherein the platform has a length parallel to said common feed conveyor and a width perpendicular to said length,
    wherein the row formation platform provides a series of product locations along the length thereof to receive thereon a series of products forming a row of products,
and the shutter device of each palletizing device is mounted stationary in the frame adjacent said second lateral side of the row formation platform, such that—in the closed state—the layer formation surface is at a height level corresponding to the row formation platform,
    wherein the width of the row formation platform is smaller than a corresponding width of the layer formation surface,
and each palletizing device further comprises a product row transfer mechanism that is adapted to slide a row of products from the row formation platform onto the layer formation surface of the shutter device in closed state,
and the installation further comprises a product ejector system with a controller and one or more product ejector devices controlled by said controller, which one or more product ejector devices are arranged near the row formation platforms and are adapted to eject a product from the common feed conveyor such that the product moves onto a selected product location of said at least two row formation platforms.

* * * * *